United States Patent Office 3,454,454
Patented July 8, 1969

3,454,454
REINFORCED THERMOPLASTIC STYRENE-ACRYLONITRILE COPOLYMER RESINS AND METHOD FOR MAKING SAME
Samuel Sterman, Williamsville, and James G. Marsden, Tonawanda, N.Y., assignors to Union Carbide Corporation, a corporation of New York
No Drawing. Filed Feb. 1, 1966, Ser. No. 523,849
Int. Cl. B32b 27/28, 17/10
U.S. Cl. 161—93          14 Claims

ABSTRACT OF THE DISCLOSURE

A method for reinforcing substantially fully polymerized thermoplastic styrene-acrylonitrile copolymer resins which comprises (1) providing a fibrous glass substrate, (2) treating the glass substrate with an organofunctional alkyltrialkoxysilane which is a member of the group consisting of an (epoxycycloalkyl)alkyltrialkoxysilane, a glycidoxyalkyltrialkoxysilane, and an (acryloxy)alkyltrialkoxysilane, or a hydrolyzate thereof, (3) intimately contacting the treated glass substrate with said resin, and (4) thermoforming the resulting composite at a temperature below the decomposition temperature of the resin and the silane; the amount of silane deposited on the glass fiber being sufficient to enhance the flexural strength of the thermoformed composite. Articles from this method are described.

---

This invention is directed to glass-reinforced resins of styrene-acrylonitrile copolymers.

The term "styrene-acrylonitrile copolymer resins" is used herein and in the appended claims in its generic sense and denotes both resins of only styrene and acrylonitrile (SAN) and also the tri-component systems such as the copolymers of styrene, acrylonitrile, and butadiene (ABS). The foregoing resins are thermoplastic materials of construction having very good physical properties and find an increasing use in a large number of applications such as housings, automobile parts, etc.

Notwithstanding the desirable physical properties of the aforementioned resins, an additional improvement thereof can be achieved by reinforcing these resins with strengthening materials such as glass in fibrous form, for example.

It has now been found that a further improvement in the physical properties of glass-reinforced resins which are the copolymers of styrene and acrylonitrile can be achieved by treating the fibrous glass, prior to its incorporation within the resin, with certain chemical compounds. Accordingly, it is the principal object of this invention to provide as a material of construction a styrene-acrylonitrile copolymer resin reinforced by fibrous glass and exhibiting materially enhanced physical properties while retaining its thermoplastic properties.

A further object of this invention is to provide a method for enhancing the physical properties of the aforementioned resins.

Still other objects will become apparent to one skilled in the art upon reference to the ensuing specification and the claims.

The objects of this invention are achieved by an article of manufacture which is a thermoplastic composite of fibrous glass, a styrene-acrylonitrile copolymer resin, and an organofunctional alkyltrialkoxy silane which can be an (epoxycycloalkyl)alkyltrialkoxysilane, a glycidoxyalkyltrialkoxysilane, an (acryloxy)alkyltrialkoxysilane, or a corresponding hydrolyzate of the foregoing.

The above article of manufacture, possessing the enhanced physical properties, can be prepared by (1) providing a fibrous glass substrate, (2) treating this substrate with the aforementioned organofunctional alkyltrialkoxysilane, (3) intimately contacting the treated glass substrate with the styrene-acrylonitrile copolymer resin, and (4) thermoforming the resulting composite at a temperature below the decomposition temperature of the resin and the silane.

As pointed out above, the thermoplastic resin within the purview of the present invention can be a copolymer of styrene and acrylonitrile or a copolymer of styrene, butadiene, and acrylonitrile. The resins are substantially fully polymerized, are chemically inert, and contain no apparent reaction sites. The resins may be thermoformed over and over again without undergoing further cure or hardening. Any residual unsaturation remaining in the resin after the copolymerization does not affect its thermoplastic nature.

The crux of the present invention lies in the selection of the proper organofunctional silane for the treatment of the fibrous glass employed for reinforcement of the resin. This selection must be carried out with great care since an improvident choice will work to the detriment of the physical properties of the ultimate article. Furthermore, considerable research into the reaction mechanisms involved has failed to cast sufficient light on the observed phenomena to enable the skilled artisan to make a reliable prediction of the performance of a particular organofunctional silane in the selected resin system even on the basis of observed performance of silanes having closely related organofunctional groups or similar resins. For example, whereas gamma-glycidoxypropyltrimethoxysilane in a polystyrene-fibrous glass system fails to bring about a marked improvement in the flexural strength of the resulting article and actually decreases the flexural strength at elevated temperatures, the same silane substantially enhances the flexural strength in a styrene-acrylonitrile copolymer resin system as is shown by the examples below.

The following groupings of organofunctional silanes have been found to materially enhance the physical properties of a styrene-acrylonitrile copolymer resin reinforced by fibrous glass: (a) an (epoxycycloalkyl)alkyltrialkoxysilane such as beta-(3,4-epoxycyclohexyl)ethyltrimethoxysilane,
beta-(3,4-epoxycyclohexyl)propyltriethoxysilane,
gamma-(3,4-epoxycyclohexyl)propyltriethoxysilane,
beta-(4,5-epoxycycloheptyl)ethyltrimethoxysilane,
beta-(2,3-epoxycycloheptyl)ethyltripropoxysilane,
delta-(2,3-epoxycycloheptyl)butyltripropoxysilane, and the like; (b) a glycidoxyalkyltrialkoxysilane such as gamma-glycidoxypropyltrimethoxysilane,
gamma-glycidoxypropyltriethoxysilane,
beta-glycidoxyethyltributoxysilane,
delta-glycidoxybutyltriethoxysilane, and the like, and (c) an (acryloxy)alkyltrialkoxysilane such as gamma-(methacryloxy)propyltrimethoxysilane,
gamma-(ethacryloxy)propyltrimethoxysilane,
gamma-(acryloxy)propyltriethoxysilane,
beta-(methacryloxy)ethyltriethoxysilane,
gamma-(methacryloxy)butyltripropoxysilane,
delta-(methacryloxy)butyltriethoxysilane, and the like.

In order to be suitable for the purposes of the present invention the glass substrate must be fibrous; however, any form of fibrous glass can be employed. Suitable are woven cloth, chopped mat, continuous strand mat, chopped strand, roving, woven roving, and the like. Powdered glass is not suitable.

The fibrous glass can be treated, i.e., sized with the organofunctional silane in any convenient manner. The silane can be applied to the glass fibers at the extrusion bushing as the glass fibers are produced, or the sizing can be carried out by means of an aqueous solution of the proper silane into which the glass fibers are dipped and subsequently dried. In the latter case the silane is deposited on the glass fiber as the corresponding hydrolyzate.

It will be apparent to one skilled in the art that the materials actually deposited on the fibrous glass from aqueous solutions are the silane-derived hydrolyzates rather than the silanes as such. The hydrolyzates are siloxanes, e.g., an aqueous solution of beta-(3,4-epoxycyclohexyl)-ethyltrimethoxysilane deposits on the glass fibers as beta-(3,4-epoxycyclohexyl)ethyl siloxane. Also, during hydrolysis the epoxy ring may open to produce the corresponding hydroxycyclohexylethylsiloxane.

The silane loading on the glass fibers must be sufficient to enhance the flexural strength of the ultimate thermoformed article. While for practical applications the loading is usually expressed in terms of weight percent, based on the weight of the treated glass fibers, it must be recognized that the minimum loading requirement may vary depending on the surface area of the particular glass fibers that are employed. When fibrous glass having a surface area of from about 0.1 to about 0.2 square meter per gram is employed, the effective silane loading can range from about 0.01 to about 5 weight percent, based on the weight of the treated fiber. Preferably the silane loading is in the range from about 0.1 to about 0.75 weight percent.

The silane-treated glass and the resin can be brought in intimate contact with each other in any convenient manner and then thermoformed. The term "thermoforming," as used herein and in the appended claims, is taken to mean the transformation of the resin-silane-glass composite into useful shapes by means of heat and/or pressure. Illustrative thermoforming processes are molding, extrusion, hot calendering, casting, vacuum forming, and the like.

Several methods of achieving intimate contact between the treated fibrous glass and the resin are illustrated by the examples below. Still other methods include the utilization of resin film or sheet and the preparation therefrom of a dry laminate having alternating plies of fibrous glass and resin which is then molded, the admixture of chopped, silane-treated glass fibers with warm or hot, fluid resin in a mechanical mixer prior to extrusion, the treating of continuous silane-treated roving with a solution of the resin, the calendering of the resin onto a treated glass cloth or mat, and the like.

The following examples further illustrate the present invention. Glass reinforcement in the form of woven glass fabric was used in all examples. The fabric is a satin weave cloth having a thickness of 10 mils, weighing about 8.9 ounces per square yard, having 57 x 54 ends and picks per square inch and having a breaking strength of 375 x 350 pounds per square inch. The fabric had the weaving size burned off in a heat cleaning operation. The control in all instances comprised resin reinforcement with cloth having had no silane treatment. The thermoplastic copolymer employed in these examples was either a styrene-acrylonitrile copolymer (SAN) or an acrylonitrile-butadiene-styrene copolymer (ABS).

Example 1

This example shows a comparison of the effect of the flexural strength of a glass reinforced poly(styrene-acrylonitrile) composite. The fibrous glass reinforcement was treated with gamma-methacryloxypropyltrimethoxysilane.

An aqueous treating bath containing about one weight percent gamma-methacryloxypropyltrimethoxysilane was prepared by adding the silane to water adjusted to pH 3.5–5 with acetic acid and gently stirring until the silane hydrolyzed. A clear, colorless solution was obtained. Ten inches wide strips of the glass fabric were passed through the treating solution, dried at room temperature, and then placed in an oven for about two and one-half minutes at about 135° C. (275° F.). The glass fabric was observed to pick up about one-half of its weight of the treating solution. After evaporation of the solvent there remained a coating on the fabric equivalent to 0.5 weight percent of the silane, based on the weight of the fabric.

The silane treated glass fabric was then impregnated with a copolymer of styrene and acrylonitrile (SAN) by passing the silane treated glass fabric through a 23 weight percent solution of resin in acetone, allowing most of the solvent to evaporate at room temperature and driving off the last traces of solvent by heating the treated fabric at about 75° C. (167° F.) for 30 minutes.

The styrene-acrylonitrile resin-impregnated, silane-treated glass fabric was then cut into 10″ x 10″ squares and 11 plies of this material placed in a press preheated to about 260° C. (500° F.) and pressed to 0.125 inch stops. The resulting composite was molded for about 20 minutes under these conditions, the press cooled, and the composite removed. This procedure produced a composite approximately 0.125 inch thick and having a resin content of 40±2 wt.-percent.

A second composite was prepared by the same procedure except untreated glass fabric was used as the reinforcement.

Flexural strength test specimens of approximately 4″ x ½″ x ⅛″ were cut from both composites and the flexural strength determined according to ASTM method D–790–61. Specimens from each composite were divided into three groups. Group 1 was tested at room temperature, Group 2 at room temperature after the specimens had been immersed in water at about 50° C. (122° F.) for 16 hours and Group 3 was tested at about 93° C. (200° F.). The flexural strengths are given in Table I, below.

Example 2

Another silane treated glass reinforced styrene-acrylonitrile composite was prepared as described in Example 1 except beta-(3,4 - epoxycyclohexyl)ethyltrimethoxysilane was used to treat the glass fabric. Due to the solubility characteristics of this silane it was applied to the glass fabric from a 75–25 water-ethanol solution. The flexural strengths of this composite under the indicated conditions are given in Table I, below.

Example 3

Another silane treated glass reinforced styrene-acrylonitrile composite was prepared as described in Example 1 except gamma-glycidoxypropyltrimethoxysilane was used to treat the glass fabric. Due to the solubility characteristics of this material it was applied from water without any pH adjustment. The flexural strengths of this composite under different conditions are given in Table I, below.

TABLE I

| Silane Composition | Wt. percent | Flexural strength, p.s.i.×10⁻³ | | |
|---|---|---|---|---|
| | | Dry | Wet | 93° C. (200° F.) |
| Control | | 45.2 | 25.3 | 16.1 |
| Gamma-methacryloxypropyltrimethoxysilane | 0.5 | 52.3 | 47.8 | 29.1 |
| Beta-(3,4-epoxycyclohexyl)ethyltrimethoxysilane | 0.5 | 64.2 | 63.2 | 20.0 |
| Gamma-glycidoxypropyltrimethoxysilane | 0.5 | 64.0 | 44.2 | 23.0 |

The above data clearly show the substantial enhancement of the flexural strength when the silane-treated glass fibers are used as reinforcement of the resin.

Example 4

This example shows a comparison of the effect on the flexural strength of a glass reinforced acrylonitrile-butadiene styrene (ABS) composite. The fibrous glass reinforcement was treated with gamma-methacryloxypropyltrimethoxysilane. The silane was applied to the glass in the following manner:

An aqueous treating bath containing about one weight percent gamma-methacryloxypropyltrimethoxysilane was prepared by adding the silane to water adjusted to pH 3.5–5 with acetic acid and gently stirring until the silane hydrolyzed. A clear colorless solution was obtained. Ten inch-wide strips of the glass fabric were passed through the treating solution, dried at room temperature, and then placed in an oven for about two and one-half minutes at about 135° C. (275° F.) The glass fabric was observed to pick up about one-half of its weight of the treating solution. After evaporation of the solvent there remained a coating on the fabric equivalent to 0.5 weight percent of the silane, based on the weight of the fabric.

The silane treated glass fabric was then impregnated with the ABS resin by passing the silane treated glass fabric through a 16 wt.-percent solution of ABS resin in methylene chloride, allowing most of the solvent to evaporate at room temperature and driving off the last traces of solvent by heating the treated fabric at 75° C. (167° F.) for 30 minutes.

The ABS impregnated, silane treated glass fabric was then cut into 10" x 10" squares and 11 plies of this material placed in a press preheated to about 204° C. (400° F.) and pressed to 0.125 inch stops. The composite was molded for about 30 minutes under these conditions, the press cooled and the composite removed. This procedure produced a composite approximately 0.125 inch thick and having a resin content of 38±2 wt.-percent.

A second composite was prepared by the same procedure except untreated glass fabric was used as the reinforcement.

Flexural strength test specimens of approximately 4" x ½" x ⅛" were cut from both composites and the flexural strength determined according to ASTM method D-790-61. Specimens from each composite were divided into four groups. Group 1 was tested at room temperature, Group 2 at room temperature after the specimens had been immersed in water at about 50° C. (122° F.) for 16 hours, Group 3 was tested at about 66° C. (150° F.) and Group 4 was tested at about 93° C. (200° F.). The flexural strengths are given in Table II, below.

Example 5

Another silane treated glass reinforced ABS composite was prepared as described in Example 1 except beta-(3,4-epoxycyclohexyl)-ethyltrimethoxysilane was used to treat the glass fabric. Due to the solubility characteristics of this material it was applied from a 75–25 water ethanol solution. Flexural strengths of this composite under the indicated conditions are given in Table II, below.

Example 6

Another silane treated glass reinforced ABS composite was prepared as described in Example 1 except gamma-glycidoxypropyltrimethoxysilane was used to treat the glass fabric. Due to the solubility characteristics of this material the treating solution was prepared by dissolving the silane in water without any pH adjustment. The flexural strengths of this composite under the indicated conditions are given in Table II, below.

TABLE II

| Silane | | Flexural strength, p.s.i.×10⁻³ | | | |
|---|---|---|---|---|---|
| Composition | Wt. percent | Dry | Wet | 66° C. (150° F.) | 93° C. (200° F.) |
| Control | | 18.9 | 14.3 | 14.0 | 3. |
| Gamma-(methacryloxy)-propyltrimethoxysilane | 0.5 | 44.6 | 39.7 | 35.9 | 14.8 |
| Beta-(3,4-epoxycyclohexyl)-ethyltrimethoxysilane | 0.5 | 41.0 | 40.4 | 29.3 | 3.3 |
| Gamma-glycidoxypropyltrimethoxysilane | 0.5 | 46.5 | 45.7 | 34.2 | 17.0 |

The above data clearly show the substantial improvement in flexural strength when the silane treated glass fibers are used as reinforcement for the resin.

We claim:
1. A method for reinforcing substantially fully polymerized thermoplastic styrene-acrylonitrile copolymer resins which resins may be repeatedly thermoformed without further cure or hardening which comprises (1) providing a fibrous glass substrate, (2) treating the glass substrate with an organofunctional alkyltrialkoxysilane which is a member of the group consisting of an (epoxycycloalkyl)alkyltrialkoxysilane, a glycidoxyalkyltrialkoxysilane, and an (acryloxy)alkyltrialkoxysilane, or a hydrolyzate thereof, (3) intimately contacting the treated glass substrate with said resin, and (4) thermoforming the resulting composite at a temperature below the decomposition temperature of the resin and the silane; the amount of silane deposited on the glass fiber being sufficient to enhance the flexural strength of the thermoformed composite and wherein thermoforming means shaping the above composite by means of one or both of heat and pressure.

2. The method in accordance with claim 1 wherein the resin is a copolymer of styrene and acrylonitrile, and the organofunctional alkyltrialkoxysilane is beta-(3,4-epoxycyclohexyl)ethyltrimethoxysilane or the corresponding hydrolyzate thereof.

3. The method in accordance with claim 1 wherein the resin is a copolymer of styrene and acrylonitrile, and the organofunctional alkyltrialkoxysilane is gamma-glycidoxypropyltrimethoxysilane or the corresponding hydrolyzate thereof.

4. The method in accordance with claim 1 wherein the resin is a copolymer of styrene and acrylonitrile, and the organofunctional alkyltrialkoxysilane is gamma-(methacryloxy)-propyltrimethoxysilane or the corresponding hydrolyzate thereof.

5. The method in accordance with claim 1 wherein the resin is a copolymer of acrylonitrile, butadiene, and styrene, and the organofunctional alkyltrialkoxysilane is beta-(3,4-epoxycyclohexyl)ethyltrimethoxysilane or the corresponding hydrolyzate thereof.

6. The method in accordance with claim 1 wherein the resin is a copolymer of acrylonitrile, butadiene, and styrene, and the organofunctional alkyltrialkoxysilane is gamma-glycidoxypropyltrimethoxysilane or the corresponding hydrolyzate thereof.

7. The method in accordance with claim 1 wherein the resin is a copolymer of acrylonitrile, butadiene, and styrene, and the organofunctional alkyltrialkoxysilane is gamma-(methacryloxy)propyltrimethoxysilane or the corresponding hydrolyzate thereof.

8. An article of manufacture which is a thermoplastic composite of fibrous glass, a styrene-acrylonitrile copolymer resin, and the product from the hydrolysis of an organofunctional alkyltrialkoxysilane selected from the group consisting of an (epoxycycloalkyl)alkyltrialkoxysilane, a glycidoxyalkyltrialkoxysilane, and an (acryloxy)alkyltrialkoxysilane, which hydrolyzate is present in an amount of from about 0.01 to about 5 weight percent, based on the weight of the fibrous glass, and said hydrolyzate is in direct contact with said fibrous glass.

9. An article of manufacture in accordance with claim 8 wherein the resin is a copolymer of styrene and acrylonitrile, and the organofunctional alkyltrialkoxysilane is beta-(3,4-epoxycyclohexyl)ethyltrimethoxysilane or the corresponding hydrolyzate thereof.

10. An article of manufacture in accordance with claim 8 wherein the resin is a copolymer of styrene and acrylonitrile, and the organofunctional alkyltrialkoxysilane is gamma-glycidoxypropyltrimethoxysilane or the corresponding hydrolyzate thereof.

11. An article of manufacture in accordance with claim 8 wherein the resin is a copolymer of styrene and acrylonitrile, and the organofunctional alkyltrialkoxysilane is gamma-(methacryloxy)propyltrimethoxysilane or the corresponding hydrolyzate thereof.

12. An article of manufacture in accordance with claim 8 wherein the resin is a copolymer of acrylonitrile, butadiene, and styrene, and the organofunctional alkyltrialkoxysilane is beta-(3,4-epoxycyclohexyl)ethyltrimethoxysilane or the corresponding hydrolyzate thereof.

13. An article of manufacture in accordance with claim 8 wherein the resin is a copolymer of acrylonitrile, butadiene, and styrene, and the organofunctional alkyltrialkoxysilane is gamma-glycidoxypropyltrimethoxysilane or the corresponding hydrolyzate thereof.

14. An article of manufacture in accordance with claim 8 wherein the resin is a copolymer of acrylonitrile, butadiene, and styrene, and the organofunctional alkyltrialkoxysilane is gamma-(methacryloxy)propyltrimethoxysilane or the corresponding hydrolyzate thereof.

References Cited

UNITED STATES PATENTS

| | | | |
|---|---|---|---|
| 3,046,239 | 7/1962 | Calvert | 260—827 X |
| 3,255,141 | 6/1966 | Damm et al. | 260—827 X |
| 3,307,967 | 3/1967 | Vanderbilt et al. | |
| 3,376,188 | 4/1968 | Clayton et al. | |

WILLIAM D. MARTIN, Primary Examiner.

R. HUSACK, Assistant Examiner.

U.S. Cl. X.R.

117—76, 126; 161—193; 260—827; 264—101, 175, 176, 331